United States Patent
Imanishi et al.

(10) Patent No.: US 12,224,619 B2
(45) Date of Patent: Feb. 11, 2025

(54) UNINTERRUPTIBLE POWER SUPPLY APPARATUS

(71) Applicant: TMEIC Corporation, Chuo-ku (JP)

(72) Inventors: Ryogo Imanishi, Chuo-ku (JP); Nobuyuki Momochi, Chuo-ku (JP)

(73) Assignee: TMEIC Corporation, Chuo-ku (JP)

( * ) Notice: Subject to any disclaimer, the term of this patent is extended or adjusted under 35 U.S.C. 154(b) by 0 days.

(21) Appl. No.: 18/250,182

(22) PCT Filed: Aug. 24, 2021

(86) PCT No.: PCT/JP2021/030957
§ 371 (c)(1),
(2) Date: Apr. 21, 2023

(87) PCT Pub. No.: WO2023/026357
PCT Pub. Date: Mar. 2, 2023

(65) Prior Publication Data
US 2024/0006911 A1 Jan. 4, 2024

(51) Int. Cl.
*H02J 9/06* (2006.01)
(52) U.S. Cl.
CPC ............. *H02J 9/061* (2013.01); *H02J 9/068* (2020.01)
(58) Field of Classification Search
CPC .... H02J 9/061; H02J 9/068; H02J 9/06; H02J 9/062; H02J 3/007; Y04S 20/12; Y04S 20/14
(Continued)

(56) References Cited

U.S. PATENT DOCUMENTS

| 2006/0138867 A1* | 6/2006 | Tian .................. H02J 3/38 307/65 |
| 2018/0152046 A1 | 5/2018 | Toyoda et al. |

(Continued)

FOREIGN PATENT DOCUMENTS

| JP | 2001-69689 A | 3/2001 |
| JP | 2010-273493 A | 12/2010 |

(Continued)

OTHER PUBLICATIONS

International Search Report mailed on Oct. 26, 2021 in PCT/JP2021/030957 filed on Aug. 24, 2021 (2 pages).

(Continued)

*Primary Examiner* — Richard Tan
(74) *Attorney, Agent, or Firm* — Oblon, McClelland, Maier & Neustadt, L.L.P.

(57) ABSTRACT

An AC/DC converter converts an AC voltage supplied from an AC power supply into a first DC power supply voltage. A power supply line transmits the first DC power supply voltage to a plurality of power conversion modules and a bypass module. The bypass module includes a switch connected between the AC power supply and the load, and a first controller that operates upon receiving an operating power supply voltage based on the first DC power supply voltage to thereby control ON/OFF of the switch. Each power conversion module includes a power converter that converts power supplied from the AC power supply or a power storage device into AC power and supplies the AC power to the load, and a second controller that operates upon receiving an operating power supply voltage based on the first DC power supply voltage to thereby control the power converter.

4 Claims, 6 Drawing Sheets

(58) Field of Classification Search
USPC .......................................................... 307/64
See application file for complete search history.

(56) References Cited

U.S. PATENT DOCUMENTS

2020/0280254 A1*  9/2020  Nishiura ............... H02M 5/458
2022/0069616 A1   3/2022  Nakamori

FOREIGN PATENT DOCUMENTS

WO    WO 2017/009998 A1    1/2017
WO    WO 2021/044599 A1    3/2021

OTHER PUBLICATIONS

Written Opinion of the International Preliminary Examining Authority issued Apr. 5, 2022 in PCT/JP2021/030957 (with English Translation), 11 pages.
Japanese Office Action issued Oct. 17, 2023 in Japanese Patent Application No. 2022-562582 (with computer-generated English Translation), 8 pages.

* cited by examiner

UNINTERRUPTIBLE POWER SUPPLY APPARATUS

TECHNICAL FIELD

The present disclosure relates to an uninterruptible power supply apparatus.

BACKGROUND ART

In recent years, a configuration employing a modular uninterruptible power supply apparatus that achieves redundancy on a module-by-module basis has been proposed for a single uninterruptible power supply apparatus. The modular uninterruptible power supply apparatus includes a plurality of power conversion modules (hereinafter also referred to as "power modules") connected in parallel, to thereby have a parallel circuit of power modules in the apparatus. When N power modules are required for power supply by an uninterruptible power supply apparatus, N+1 power modules are mounted to achieve redundancy, whereby the quality of the power supply can be improved.

Conventionally, some uninterruptible power supply apparatuses are equipped with a control power supply that generates an operating power supply voltage for a controller that controls the entire uninterruptible power supply apparatus (see WO 2021/044599 (PTL 1), for example). The control power supply is configured to generate the operating power supply voltage for the controller based on an AC voltage provided from a commercial AC power supply.

CITATION LIST

Patent Literature

PTL 1: WO 2021/044599

SUMMARY OF INVENTION

Technical Problem

The modular uninterruptible power supply apparatus described above employs a hot swap method. The hot swap method means a configuration that allows a power module to be stopped, and this power module to be removed and inserted, during operation of the uninterruptible power supply apparatus. According to this method, a power module can be replaced while power feed by the uninterruptible power supply apparatus is continued at the time of failure or inspection of the power module.

To implement hot swap, each power module contains a controller for controlling a built-in power converter, and a control power supply for generating an operating power supply voltage for the controller. The controller includes a control circuit that generates a control signal for controlling a corresponding power converter, a driver that drives the power converter in accordance with the control signal, and the like. A microcomputer forming the control circuit and the driver may have different operating power supply voltages. Thus, the control power supply includes an AC/DC converter and a DC/DC converter, and is configured to be able to generate multiple operating power supply voltages from an AC voltage.

In a configuration where each power module contains the control power supply that generates multiple operating power supply voltages as described above, however, the number of control power supplies increases as the number of power modules increases. This may result in the modular uninterruptible power supply apparatus becoming larger and more expensive.

The present disclosure has been made to solve the problem as described above, and has an object to make smaller and less expensive a modular uninterruptible power supply apparatus including a plurality of power modules connected in parallel.

Solution to Problem

An uninterruptible power supply apparatus according to an aspect of the present disclosure includes: a plurality of power conversion modules connected in parallel between an AC power supply and a load; a bypass module connected between the AC power supply and the load; an AC/DC converter; and a power supply line. The AC/DC converter converts an AC voltage supplied from the AC power supply or an AC voltage supplied to the load into a first DC power supply voltage. The power supply line transmits the first DC power supply voltage generated by the AC/DC converter to the plurality of power conversion modules and the bypass module. The bypass module includes a switch connected between the AC power supply and the load, and a first controller that operates upon receiving an operating power supply voltage based on the first DC power supply voltage to thereby control ON/OFF of the switch. Each of the plurality of power conversion modules includes a power converter that converts power supplied from the AC power supply or a power storage device into AC power and supplies the AC power to the load, and a second controller that operates upon receiving an operating power supply voltage based on the first DC power supply voltage to thereby control the power converter.

Advantageous Effects of Invention

According to the present disclosure, a modular uninterruptible power supply apparatus including a plurality of power modules connected in parallel can be made smaller and less expensive.

DESCRIPTION OF EMBODIMENTS

Embodiments of the present disclosure are described hereinafter in detail with reference to the drawings. In the following, the same or corresponding parts in the drawings are denoted by the same reference characters, and a description thereof will not be repeated in principle.

First Embodiment

Figure 1:
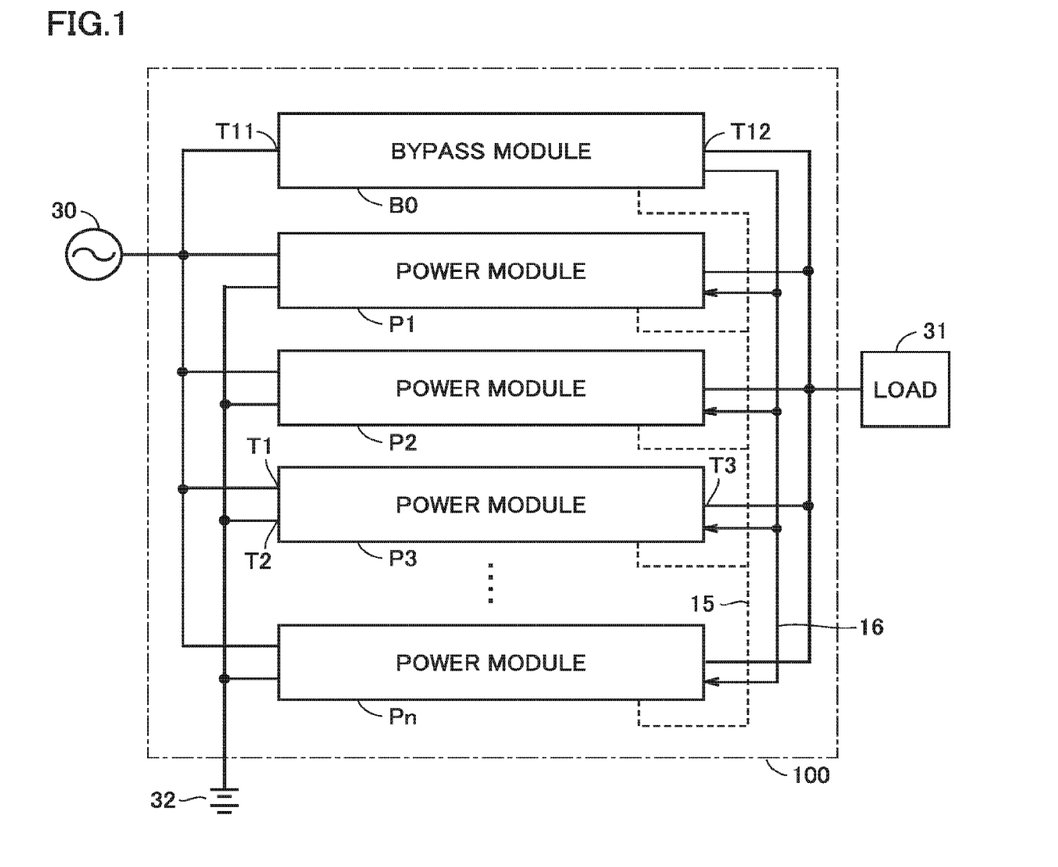
FIG. 1 is a circuit block diagram showing a configuration of an uninterruptible power supply apparatus according to a first embodiment.

FIG. 1 is a circuit block diagram showing a configuration of an uninterruptible power supply apparatus according to a first embodiment.

As shown in FIG. 1, an uninterruptible power supply apparatus 100 according to the first embodiment includes a bypass module B0, a plurality of power modules P1 to Pn (n is an integer greater than or equal to 2), a battery 32, a communication line 15, and a power supply line 16. Bypass module B0 and power modules P1 to Pn are communicatively connected to each other by communication line 15. Bypass module B0 and power modules P1 to Pn are further connected to each other by power supply line 16.

Bypass module B0 has an input terminal T11, an output terminal T12, and a switch (not shown) connected between input terminal T11 and output terminal T12.

Each of power modules P1 to Pn is a power conversion module having a converter and an inverter (not shown). In the following description, power modules P1 to Pn may be collectively referred to as a "power module P." Power module P has an input terminal T1, a battery terminal T2, and an output terminal T3.

Input terminal T11 of bypass module B0 and input terminal T1 of each power module P are both connected to a commercial AC power supply 30. Input terminal T11 and input terminal T1 receive an AC voltage (hereinafter also referred to as an AC input voltage) VI with a commercial frequency supplied from commercial AC power supply 30.

Battery terminal T2 of each power module P is connected to battery 32. Battery 32 stores DC power. Battery 32 corresponds to an example of "power storage device." Instead of battery 32, a capacitor may be connected to battery terminal T2.

Output terminal T12 of bypass module B0 and output terminal T3 of each power module P are both connected to a load 31. That is, bypass module B0 and power modules P1 to Pn are connected in parallel with each other between commercial AC power supply 30 and load 31. Load 31 is driven by AC power supplied from bypass module B0 or power modules P1 to Pn.

Such an uninterruptible power supply apparatus is referred to as a "modular uninterruptible power supply apparatus." A modular uninterruptible power supply apparatus has an internal parallel circuit of a number of power modules corresponding to the capacity of the uninterruptible power supply apparatus. When N power modules are required for power supply by an uninterruptible power supply apparatus, N+1 power modules are mounted to achieve redundancy, whereby the quality of the power supply can be improved.

A method for achieving redundancy on a module-by-module basis in a single uninterruptible power supply apparatus in this manner is also referred to as a "hot swap method." The hot swap method means a structure that allows some power modules to be stopped, and these power modules to be removed and inserted, during operation of the uninterruptible power supply apparatus. According to this method, power modules can be replaced while power feed by the uninterruptible power supply apparatus is continued at the time of failure or inspection of the power modules.

Uninterruptible power supply apparatus 100 has an inverter power feed mode and a bypass power feed mode. The inverter power feed mode is a mode in which AC power is supplied from power module P to load 31. In the inverter power feed mode, AC power supplied from commercial AC power supply 30 is converted into DC power by the converter of power module P, and further, the DC power is converted into AC power by the inverter and the AC power is supplied to load 31. The bypass power feed mode is a mode in which AC power is supplied from commercial AC power supply 30 to load 31 through bypass module B0. In the bypass power feed mode, AC power supplied from commercial AC power supply 30 is supplied to load 31 without passing through power module P.

Figure 2:
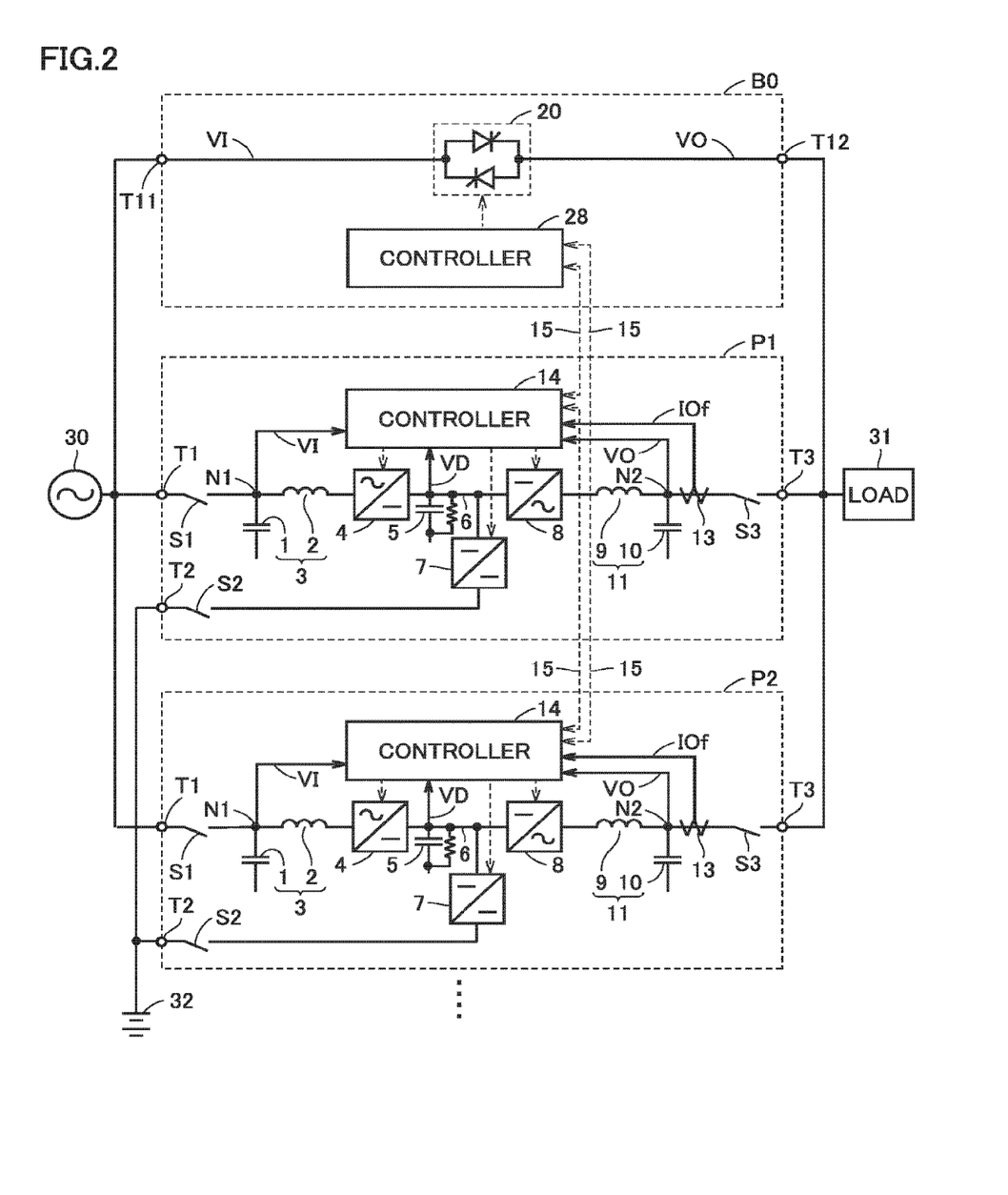
FIG. 2 is a circuit block diagram showing configurations of a bypass module and power modules.

FIG. 2 is a circuit block diagram showing configurations of bypass module B0 and power modules P shown in FIG. 1. Uninterruptible power supply apparatus 100 converts three-phase AC power from commercial AC power supply 30 into DC power, and further, converts the DC power into three-phase AC power and supplies the three-phase AC power to load 31. FIG. 2 shows only a circuit corresponding to one of three phases (U-phase, V-phase and W-phase) in order to simplify the illustration and description.

As shown in FIG. 2, bypass module B0 includes a switch 20 and a controller 28. Switch 20 is connected between input terminal T11 and output terminal T12. Switch 20 is, for example, a thyristor switch having a pair of thyristors connected in anti-parallel. Controller 28 controls ON/OFF of switch 20. Switch 20 is turned off in the inverter power feed mode, and is turned on in the bypass power feed mode.

Controller 28 is communicatively connected to controllers 14 included in power modules P1 to Pn by communication line 15. Controller 28 exchanges information with controllers 14 of power modules P1 to Pn via communication line 15. The communication between controller 28 and controllers 14 may be implemented as either wireless or wired communication. Controller 28 corresponds to an example of "first controller."

Controller 28 can be configured mainly by a microcomputer, for example. As an example, controller 28 contains a memory and a CPU (Central Processing Unit), which are not shown in the figure, and can perform control operations by software processing in which the CPU executes a program prestored in the memory. Alternatively, some or all of the control operations can be implemented by hardware processing using built-in dedicated electronic circuitry and the like, instead of by the software processing.

In addition to input terminal T1, battery terminal T2 and output terminal T3, power module P includes switches S1 to S3, capacitors 1, 5 and 10, reactors 2 and 9, a DC line 6, a converter 4, a bidirectional chopper 7, an inverter 8, a current detector 13, and controller 14.

Input terminal T1 receives AC power with a commercial frequency from commercial AC power supply 30. Switch S1 and reactor 2 are connected in series between input terminal T1 and an input node of converter 4. Capacitor 1 is connected to a node N1 between switch S1 and reactor 2. Switch S1 is turned on when corresponding power module P is put into operation, and is turned off when corresponding power module P is put on standby. An instantaneous value of AC input voltage VI that appears on node N1 is detected by controller 14. Based on the instantaneous value of AC input voltage VI, it is determined whether a power failure has occurred or not, and the like.

Capacitor 1 and reactor 2 constitute an AC filter 3. AC filter 3 is a low pass filter, allows an AC current with a commercial frequency to flow from commercial AC power supply 30 to converter 4, and prevents a signal with a switching frequency generated at converter 4 from flowing toward commercial AC power supply 30.

Converter 4 is controlled by controller 14, and in a sound state of commercial AC power supply 30 where AC power is being supplied normally from commercial AC power supply 30, converts AC power into DC power and outputs the DC power to DC line 6. At the time of a power failure when the supply of AC power from commercial AC power supply 30 is stopped, the operation of converter 4 is stopped. An output voltage from converter 4 can be controlled to a desired value.

DC line 6 is connected to converter 4, bidirectional chopper 7 and inverter 8. A DC voltage VD that appears on DC line 6 is detected by controller 14. In a sound state of commercial AC power supply 30, controller 14 controls converter 4 such that DC voltage VD output from converter 4 becomes a reference DC voltage VDr.

Capacitor 5 is connected to DC line 6, and smooths DC voltage VD on DC line 6. An instantaneous value of DC voltage VD that appears on DC line 6 is detected by controller 14. A resistive element is connected in parallel with capacitor 5. The resistive element is provided to reduce DC voltage VD when power module P fails, to protect a user of uninterruptible power supply apparatus 100. A resistance value of the resistive element is set such that terminal-to-terminal voltage VD of capacitor 5 can be reduced to 0 V in a short time when the operation of converter 4 is stopped.

Bidirectional chopper 7 has a high-voltage side node connected to DC line 6, and a low-voltage side node connected to battery terminal T2 through switch S2. Bidirectional chopper 7 is controlled by controller 14. In a sound state of commercial AC power supply 30, bidirectional chopper 7 stores DC power generated by converter 4 in battery 32. At the time of a power failure of commercial AC power supply 30, bidirectional chopper 7 supplies DC power of battery 32 to inverter 8. Switch S2 is turned on when power module P is in use, and is turned off during maintenance of battery 32, for example.

Inverter 8 is controlled by controller 14, and in a sound state of commercial AC power supply 30, converts DC power generated by converter 4 into AC power with a commercial frequency. At the time of a power failure of commercial AC power supply 30, inverter 8 converts DC power supplied from battery 32 through bidirectional chopper 7 into AC power with a commercial frequency. An output voltage from inverter 8 can be controlled to a desired value.

Reactor 9 has a first terminal connected to an output node of inverter 8, and a second terminal (node N2) connected to output terminal T3 through switch S3. Capacitor 10 is connected to node N2. An instantaneous value of an AC output voltage V0 that appears on node N2 is detected by controller 14. Current detector 13 detects an instantaneous value of a current IO flowing from node N2 to output terminal T3 (that is, load 31) through switch S3, and provides a signal IOf indicating the detected value to controller 14.

Reactor 9 and capacitor 10 constitute an AC filter 11. AC filter 11 is a low pass filter, allows an AC current with a commercial frequency to flow from inverter 8 toward load 31, and prevents a signal with a switching frequency generated at inverter 8 from flowing toward load 31. In other words, AC filter 11 converts a rectangular wave voltage output from inverter 8 into a sinusoidal voltage.

Switch S3 is controlled by controller 14. Controller 14 turns on switch S3 when corresponding power module P is in use, and turns off switch S3 during maintenance of corresponding power module P.

Controller 14 can be configured mainly by a microcomputer, for example. As an example, controller 14 contains a memory and a CPU, which are not shown in the figure, and can perform control operations by software processing in which the CPU executes a program prestored in the memory. Alternatively, some or all of the control operations can be implemented by hardware processing using built-in dedicated electronic circuitry and the like, instead of by the software processing.

Controller 14 controls corresponding power module P based on AC input voltage VI, DC voltage VD, a terminal-to-terminal voltage (battery voltage) VB of battery 32, AC output current IO, AC output voltage V0, and the like. Controller 14 detects whether a power failure has occurred or not based on a detected value of AC input voltage VI, and controls converter 4 and inverter 8 in synchronization with a phase of AC input voltage VI.

In a sound state of commercial AC power supply 30, controller 14 controls converter 4 such that DC voltage VD becomes reference DC voltage VDr, and at the time of a power failure of commercial AC power supply 30, controller 14 stops the operation of converter 4. In a sound state of commercial AC power supply 30, controller 14 controls bidirectional chopper 7 such that battery voltage VB becomes a reference battery voltage VBr. At the time of a power failure of commercial AC power supply 30, controller 14 controls bidirectional chopper 7 such that DC voltage VD on DC line 6 becomes reference DC voltage VDr.

Controller 14 is also communicatively connected to controller 14 of each of the other power modules P and controller 28 of bypass module B0 by communication line 15, and exchanges information with controller 14 of each of the other power modules P and controller 28 of bypass module B0. Controller 14 controls converter 4 and inverter 8 such that shared currents of power modules P1 to Pn are equal.

Controller 28 determines, based on output signals IOf from the plurality of current detectors 13, a sum current of output currents IO from the plurality of power modules P1 to Pn, that is, a load current IL, and determines an appropriate number of operating power modules P required to supply that load current IL. Further, controller 28 compares the determined appropriate number of operating power modules with a number of currently operating power modules, and based on the comparison result and a predetermined priority order in which the power modules are put on standby, determines whether each of power modules P1 to Pn should be put on standby or put into operation. Controller 28 notifies controller 14 of each of power modules P1 to Pn of the determination result via communication line 15.

When corresponding power module P should be put on standby, controller 14 turns off corresponding switch S1 to prevent a current flow from commercial AC power supply 30 into corresponding AC filter 3, and stops the operation of corresponding converter 4, bidirectional chopper 7 and inverter 8. When corresponding power module P should be put into operation, controller 14 maintains corresponding switch S1 in an on state, and continues the operation of corresponding converter 4, bidirectional chopper 7 and inverter 8.

Figure 3:
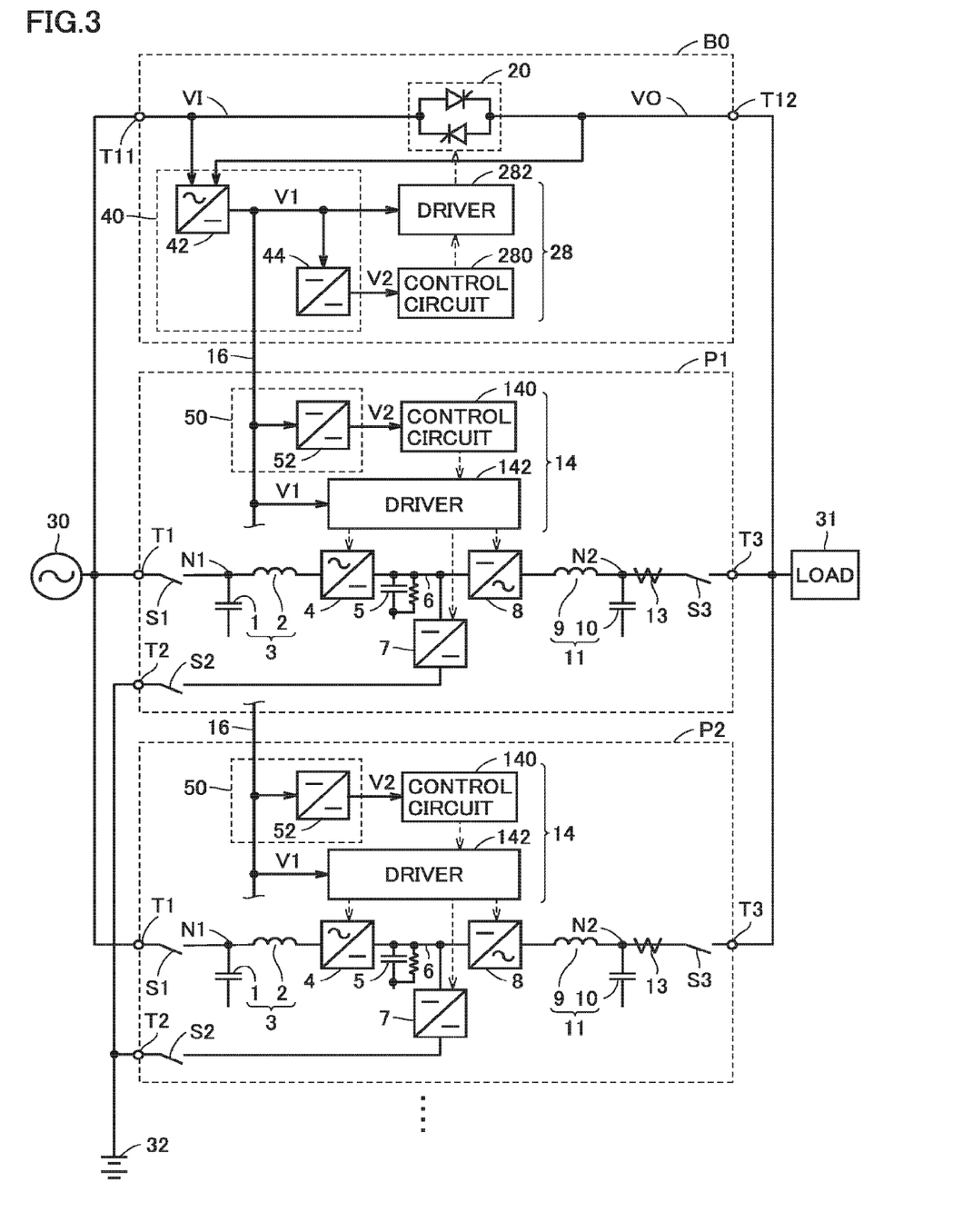
FIG. 3 is a block diagram showing configurations of control power supplies of the bypass module and the power modules.

Referring now to FIG. 3, control power supplies that generate operating power supply voltages for controllers 14 and 28 in uninterruptible power supply apparatus 100 according to the first embodiment are described.

FIG. 3 is a block diagram showing configurations of control power supplies of bypass module B0 and power modules P.

As shown in FIG. 3, bypass module B0 includes a control power supply 40. Control power supply 40 is connected to input terminal T11 and output terminal T12. Control power supply 40 generates an operating power supply voltage for controller 28 using AC input voltage VI that appears on input terminal T11 or AC output voltage V0 that appears on output terminal T12. Control power supply 40 corresponds to an example of "first control power supply."

Specifically, control power supply 40 includes an AC/DC converter 42 and a DC/DC converter 44. Upon start-up of uninterruptible power supply apparatus 100, AC/DC converter 42 converts AC input voltage VI into a DC power supply voltage V1. At the time of a power failure of commercial AC power supply 30, AC/DC converter 42 converts AC output voltage V0 into DC power supply voltage V1. Accordingly, even when a power failure of commercial AC power supply 30 occurs, control power supply 40 can generate DC power supply voltage V1 using AC output voltage V0.

DC/DC converter 44 converts DC power supply voltage V1 generated by AC/DC converter 42 into a DC power supply voltage V2. DC power supply voltage V2 is lower than DC power supply voltage V1. For example, DC power supply voltage V1 is several tens of volts, and DC power supply voltage V2 is several volts. DC power supply voltage V1 corresponds to an example of "first DC power supply voltage," and DC power supply voltage V2 corresponds to an example of "second DC power supply voltage." DC/DC converter 44 corresponds to an example of "first DC/DC converter."

Controller 28 includes a control circuit 280 and a driver 282. Control circuit 280 operates upon receiving a supply of DC power supply voltage V2. Control circuit 280 can be configured mainly by a microcomputer or an FPGA (Field-Programmable Gate Array). Control circuit 280 generates a control signal for controlling ON/OFF of switch 20. Specifically, control circuit 280 generates an H (logic high) level control signal for turning on switch 20, and generates an L (logic low) level control signal for turning off switch 20.

Driver 282 operates upon receiving a supply of DC power supply voltage V1. Driver 282 drives switch 20 in accordance with the control signal generated by control circuit 280. Specifically, driver 282 generates, based on DC power supply voltage V1, an electric signal (gate signal) for input to the gate of a thyristor forming switch 20. Driver 282 generates, in accordance with the H level control signal, a gate signal of a voltage higher than a threshold voltage of the thyristor, and inputs the gate signal to the gate of the thyristor. Driver 282 generates, in accordance with the L level control signal, a gate signal of a voltage lower than the threshold voltage of the thyristor, and inputs the gate signal to the gate of the thyristor.

Control power supply 40 further transmits DC power supply voltage V1 generated by AC/DC converter 42 to power modules P1 to Pn via power supply line 16.

Power module P includes a control power supply 50. Control power supply 50 is connected to power supply line 16. Control power supply 50 generates an operating power supply voltage for controller 14 using DC power supply voltage V1 supplied via power supply line 16. Specifically, control power supply 50 includes a DC/DC converter 52. DC/DC converter 52 converts DC power supply voltage V1 into DC power supply voltage V2. Control power supply 50 corresponds to an example of "second control power supply." DC/DC converter 52 corresponds to an example of "second DC/DC converter."

Controller 14 includes a control circuit 140 and a driver 142. Control circuit 140 operates upon receiving a supply of DC power supply voltage V2. Control circuit 140 can be configured mainly by a microcomputer or an FPGA. Control circuit 140 generates a control signal for controlling ON/OFF of a semiconductor switching element (not shown) included in each of converter 4, bidirectional chopper 7 and inverter 8. Typically, a MOSFET (Metal Oxide Semiconductor Field Effect Transistor) or an IGBT (Insulated Gate Bipolar Transistor) can be applied to the semiconductor switching element. Control circuit 140 generates an H level control signal for turning on the semiconductor switching element, and generates an L level control signal for turning off the semiconductor switching element.

Driver 142 operates upon receiving DC power supply voltage V1. Driver 142 drives converter 4, bidirectional chopper 7 and inverter 8 in accordance with the control signals generated by control circuit 140. Specifically, driver 142 generates, based on DC power supply voltage V1, an electric signal (gate signal) for input to a control electrode (for example, a gate) of the semiconductor switching element included in each of converter 4, bidirectional chopper 7 and inverter 8. Driver 142 generates, in accordance with the H level control signal, a gate signal higher than a threshold voltage of the semiconductor switching element, and inputs the gate signal to the gate of the semiconductor switching element. Driver 142 generates, in accordance with the L level control signal, a gate signal of a voltage lower than the threshold voltage of the semiconductor switching element, and inputs the gate signal to the gate of the semiconductor switching element.

Although the operating power supply voltage for controller 28 of bypass module B0 and the operating power supply voltage for controller 14 of power module P are equal to each other in the present embodiment, controller 28 and controller 14 may have operating power supply voltages of different magnitudes.

Although each of control power supply 40 and control power supply 50 is configured to generate two types of DC power supply voltages in the present embodiment, they can be configured to generate three or more types of DC power supply voltages depending on the configurations of controllers 14 and 28.

As described above, in the uninterruptible power supply apparatus according to the first embodiment, an AC voltage is converted into DC power supply voltage V1 by single AC/DC converter 42, and this DC power supply voltage V1 is provided to control power supply 50 of each of the plurality of power modules P1 to Pn via power supply line 16. In each of power modules P1 to Pn, control power supply 50 generates DC power supply voltage V2 using DC power supply voltage V1 provided via power supply line 16.

That is, in the uninterruptible power supply apparatus according to the first embodiment, AC/DC converter 42 is shared between control power supplies 40 and 50 of bypass module B0 and the plurality of power modules P1 to Pn. Accordingly, an AC/DC converter does not need to be installed in each of power modules P1 to Pn, as shown in FIG. 3.

Here, a comparison is made between the configuration in which AC/DC converter 42 is shared as shown in FIG. 3, and a configuration in which an AC/DC converter is mounted on each power module P. Shared AC/DC converter 42 provides increased output power compared to an AC/DC converter mounted on each power module P, thus requiring a larger capacity and becoming larger in size. On the other hand, in each power module P, the number of components can be reduced because an AC/DC converter does not need to be installed. Thus, power module P can be made smaller and less expensive. As a result, uninterruptible power supply apparatus 100 as a whole can be made smaller and less expensive.

In addition, in the uninterruptible power supply apparatus according to the first embodiment, while AC/DC converter 42 is shared between bypass module B0 and the plurality of power modules P1 to Pn, the operating power supply voltage for control circuit 140 is generated using DC/DC converter 52 for each power module P. The microcomputer or the FPGA forming control circuit 140 may fail to operate normally if noise is applied to the operating power supply voltage due to disturbances such as noise or electromagnetic noise. Thus, if the operating power supply voltage is supplied to control power supply 50 of each power module P via power supply line 16, noise superimposed on power supply line 16 may prevent stable operation of the power converter in corresponding power module P. In the first embodiment, for each power module P, the operating power supply voltage for control circuit 140 is generated using DC power supply voltage V1 supplied from power supply line 16. Thus, stable operation of power module P can be achieved without being affected by the noise described above.

Second Embodiment

Figure 4:
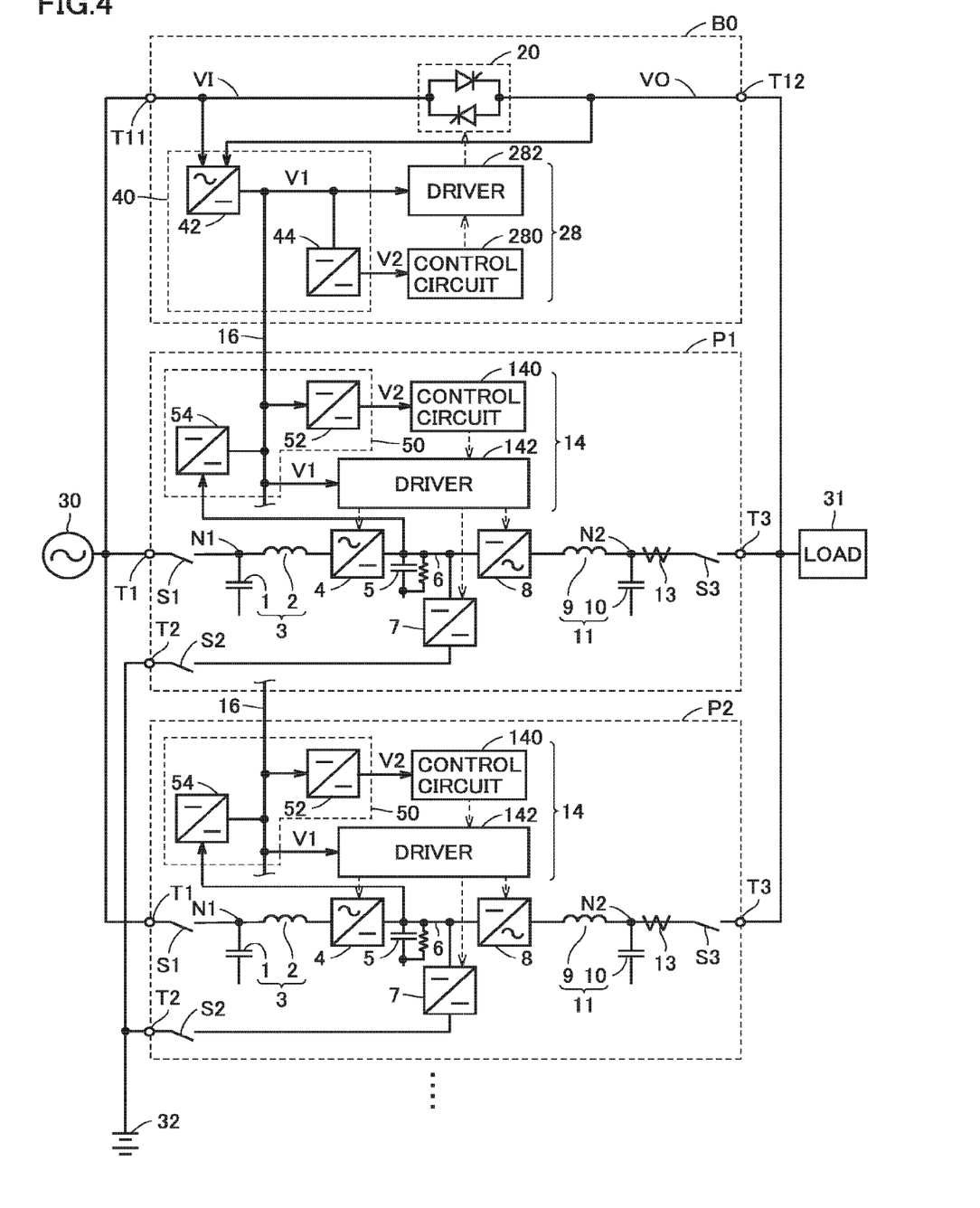
FIG. 4 is a block diagram showing configurations of control power supplies in an uninterruptible power supply apparatus according to a second embodiment.

FIG. 4 is a block diagram showing configurations of control power supplies in uninterruptible power supply apparatus 100 according to a second embodiment. As uninterruptible power supply apparatus 100 according to the second embodiment is identical in configuration to uninterruptible power supply apparatus 100 according to the first embodiment except for the control power supplies, a detailed description will not be repeated.

As shown in FIG. 4, bypass module B0 includes control power supply 40. Control power supply 40 is identical in configuration to control power supply 40 shown in FIG. 3. That is, control power supply 40 includes AC/DC converter 42 that converts AC input voltage VI or AC output voltage V0 into DC power supply voltage V1, and DC/DC converter 44 that converts DC power supply voltage V1 into DC power supply voltage V2.

Power module P includes control power supply 50. Control power supply 50 includes DC/DC converter 52 and a DC/DC converter 54. Control power supply 50 is different from control power supply 50 shown in FIG. 3 in that it includes DC/DC converter 54.

DC/DC converter 54 is connected to DC line 6. DC/DC converter 54 converts DC voltage VD that appears on DC line 6 into DC power supply voltage V1. DC/DC converter 54 outputs generated DC power supply voltage V1 to power supply line 16. Driver 142 operates upon receiving a supply of DC power supply voltage V1 via power supply line 16. DC/DC converter 54 corresponds to an example of "third DC/DC converter."

DC/DC converter 52 converts DC power supply voltage V1 supplied via power supply line 16 into DC power supply voltage V2. Control circuit 140 operates upon receiving a supply of DC power supply voltage V2.

In the second embodiment, upon start-up of uninterruptible power supply apparatus 100, control power supply 50 of power module P generates the operating power supply voltage (DC power supply voltages V1 and V2) for controller 14 using DC power supply voltage V1 supplied from bypass module B0 via power supply line 16.

When uninterruptible power supply apparatus 100 is started, in power module P, controller 14 operates upon receiving a supply of the operating power supply voltage. Specifically, controller 14 turns on switch S1, and converts AC input voltage VI input to converter 4 into DC voltage VD and outputs DC voltage VD to DC line 6. Controller 14 controls converter 4 such that DC voltage VD output from converter 4 becomes reference DC voltage VDr. Capacitor 5 is initially charged upon receiving DC voltage VD output to DC line 6.

During operation of uninterruptible power supply apparatus 100, control power supply 50 of power module P generates the operating power supply voltage (DC power supply voltages V1 and V2) for controller 14 using DC voltage VD that appears on DC line 6 of corresponding power module P.

In this manner, in the second embodiment, during operation of uninterruptible power supply apparatus 100, each of power modules P1 to Pn is configured to generate the operating power supply voltage (DC power supply voltages V1 and V2) using DC voltage VD on DC line 6, without depending on DC power supply voltage V1 supplied from bypass module B0 via power supply line 16. That is, during operation of uninterruptible power supply apparatus 100, power modules P1 to Pn each generate the operating power supply voltage independently of bypass module B0. Accordingly, during operation of uninterruptible power supply apparatus 100, hot swap can be implemented in which bypass module B0 is stopped, and bypass module B0 is removed and inserted.

Third Embodiment

Figure 5:
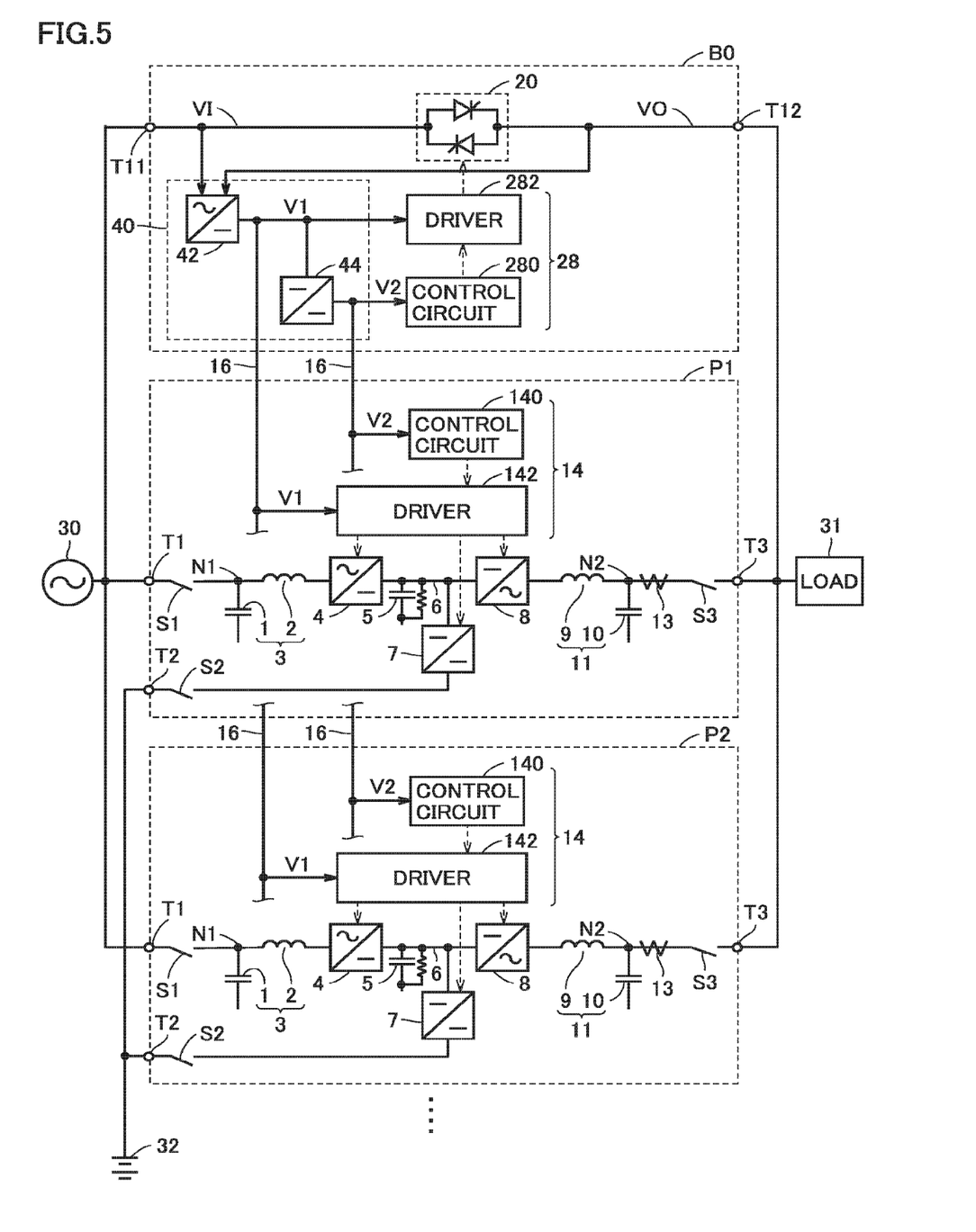
FIG. 5 is a block diagram showing a configuration of a control power supply in an uninterruptible power supply apparatus according to a third embodiment.

FIG. 5 is a block diagram showing a configuration of a control power supply in uninterruptible power supply apparatus 100 according to a third embodiment. As uninterruptible power supply apparatus 100 according to the third embodiment is identical in configuration to uninterruptible power supply apparatus 100 according to the first embodiment except for the control power supplies, a detailed description will not be repeated.

As shown in FIG. 5, bypass module B0 includes control power supply 40. Control power supply 40 is identical in configuration to control power supply 40 shown in FIG. 3. That is, control power supply 40 includes AC/DC converter 42 that converts AC input voltage VI or AC output voltage V0 into DC power supply voltage V1, and DC/DC converter 44 that converts DC power supply voltage V1 into DC power supply voltage V2.

Power module P is different from power module P shown in FIG. 3 in that it does not have control power supply 50. Power module P receives a supply of DC power supply voltages V1 and V2 from control power supply 40 of bypass module B0 via power supply line 16. Control circuit 140 operates upon receiving a supply of DC power supply voltage V2 from power supply line 16. Driver 142 operates upon receiving a supply of DC power supply voltage V1 from power supply line 16.

In the third embodiment, power module P does not have control power supply 50. Controller 14 operates upon receiving a supply of the operating power supply voltage (DC power supply voltages V1 and V2) generated by control power supply 40 of bypass module B0. Thus, control power supply 40 according to the third embodiment has DC/DC converter 44 of increased capacity compared to control power supply 40 shown in FIG. 3, thus becoming larger in size.

On the other hand, in each of power modules P1 to Pn, the number of components can be reduced because control power supply 50 does not need to be installed. Thus, power modules P1 to Pn can be made smaller and less expensive. As a result, uninterruptible power supply apparatus 100 as a whole can be made even smaller and less expensive.

In the third embodiment, however, the operating power supply voltage (DC power supply voltage V2) for control circuit 140 may be more susceptible to noise superimposed on power supply line 16. Therefore, the configuration of the third embodiment may be considered suitable for an uninterruptible power supply apparatus including power module P in which control circuit 140 is highly resistant to noise.

Fourth Embodiment

Figure 6:
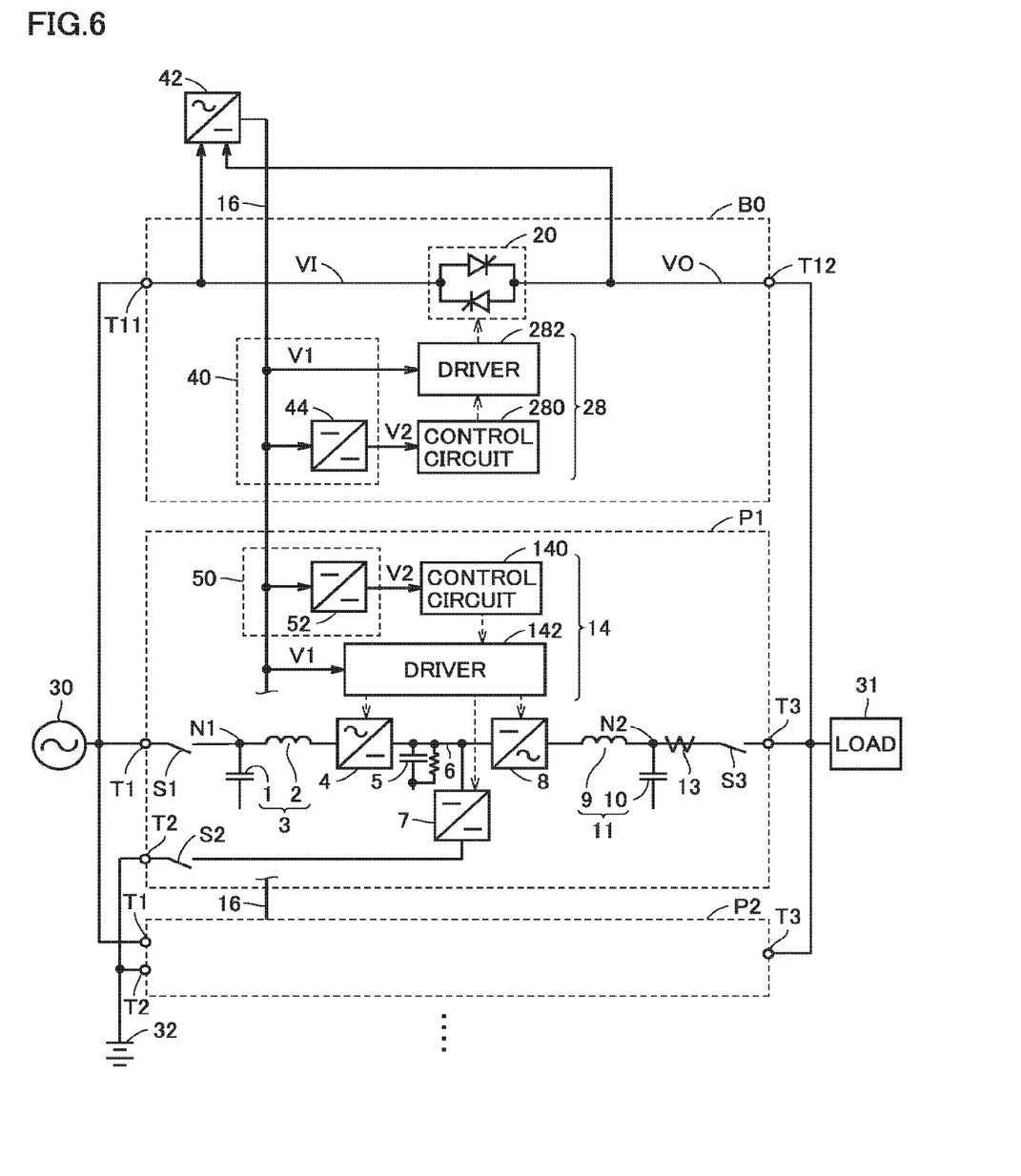
FIG. 6 is a block diagram showing configurations of control power supplies in an uninterruptible power supply apparatus according to a fourth embodiment.

The first to third embodiments above have described configuration examples in which AC/DC converter 42 is installed inside bypass module B0, a fourth embodiment describes a configuration in which AC/DC converter 42 is provided outside bypass module B0.

FIG. 6 is a block diagram showing configurations of control power supplies in uninterruptible power supply apparatus 100 according to the fourth embodiment. Uninterruptible power supply apparatus 100 according to the fourth embodiment is different from uninterruptible power supply apparatus 100 shown in FIG. 3 in that AC/DC converter 42 is provided separately from control power supply 40 of bypass module B0.

AC/DC converter 42 is installed, for example, inside an enclosure that houses bypass module B0 and power modules P1 to Pn. Although not shown, AC/DC converter 42 may be mounted, for example, inside a controller module used for general control of entire uninterruptible power supply apparatus 100.

AC/DC converter 42 is connected to input terminal T11 and output terminal T12. AC/DC converter 42 converts AC input voltage VI or AC output voltage V0 into DC power supply voltage V1. AC/DC converter 42 transmits DC power supply voltage V1 to bypass module B0 and power modules P1 to Pn via power supply line 16.

In bypass module B0, control power supply 40 is connected to power supply line 16. Control power supply 40 includes DC/DC converter 44. DC/DC converter 44 converts DC power supply voltage V1 into DC power supply voltage V2. Control circuit 280 operates upon receiving a supply of DC power supply voltage V2 from DC/DC converter 44. Driver 282 operates upon receiving DC power supply voltage V1 from power supply line 16.

In power module P, control power supply 50 is connected to power supply line 16. Control power supply 50 includes DC/DC converter 52. DC/DC converter 52 converts DC power supply voltage V1 into DC power supply voltage V2. Control circuit 140 operates upon receiving a supply of DC power supply voltage V2 from DC/DC converter 52. Driver 142 operates upon receiving DC power supply voltage V1 from power supply line 16.

Also in the fourth embodiment, AC/DC converter 42 is shared between bypass module B0 and the plurality of power modules P1 to Pn. Thus, the same effect as that of the first embodiment is provided.

It should be understood that the embodiments disclosed herein are illustrative and non-restrictive in every respect. The present disclosure is defined by the terms of the claims, rather than the description above, and is intended to include any modifications within the scope and meaning equivalent to the terms of the claims.

REFERENCE SIGNS LIST 1, 5, 10 capacitor; 2, 9 reactor; 3, 11 AC filter; 4 converter; 6 DC line; 7 bidirectional chopper; 8 inverter; 13 current detector; 14, 28 controller; 15 communication line; 16 power supply line; 20, S1 to S3 switch; 30 commercial AC power supply; 31 load; 32 battery; 40, 50 control power supply; 42 AC/DC converter; 44, 52, 54 DC/DC converter; 100 uninterruptible power supply apparatus; 140, 280 control circuit; 142, 282 driver; B0 bypass module; P1 to Pn, P power module; T1, T11 input terminal; T2 battery terminal; T3, T12 output terminal.

The invention claimed is:

1. An uninterruptible power supply apparatus comprising:
a plurality of power conversion modules connected in parallel between an AC power supply and a load;
a bypass module connected between the AC power supply and the load;
an AC/DC converter that converts an AC voltage supplied from the AC power supply or an AC voltage supplied to the load into a first DC power supply voltage; and
a power supply line that transmits the first DC power supply voltage generated by the AC/DC converter to the plurality of power conversion modules and the bypass module, wherein
the bypass module includes
a switch connected between the AC power supply and the load, and
a first controller that operates upon receiving an operating power supply voltage based on the first DC power supply voltage to thereby control ON/OFF of the switch, and
each of the plurality of power conversion modules includes
a power converter that converts power supplied from the AC power supply or a power storage device into AC power and supplies the AC power to the load, and
a second controller that operates upon receiving an operating power supply voltage based on the first DC power supply voltage to thereby control the power converter,
the bypass module further includes a first control power supply, the first control power supply being connected to the power supply line and generating the operating power supply voltage for the first controller using the first DC power supply voltage, and
each of the plurality of power conversion modules further includes a second control power supply, the second control power supply being connected to the power supply line and generating the operating power supply voltage for the second controller using the first DC power supply voltage, wherein
the first control power supply includes a first DC/DC converter that converts the first DC power supply voltage into a second DC power supply voltage, and
the first controller includes
a first control circuit that operates upon receiving the second DC power supply voltage from the first DC/DC converter to thereby generate a control signal for controlling ON/OFF of the switch, and
a first driver that operates upon receiving the first DC power supply voltage from the power supply line to thereby drive the switch in accordance with the control signal output from the first control circuit.

2. An uninterruptible power supply apparatus comprising:
a plurality of power conversion modules connected in parallel between an AC power supply and a load;
a bypass module connected between the AC power supply and the load;
an AC/DC converter that converts an AC voltage supplied from the AC power supply or an AC voltage supplied to the load into a first DC power supply voltage, and
a power supply line that transmits the first DC power supply voltage generated by the AC/DC converter to the plurality of power conversion modules and the bypass module, wherein
the bypass module includes
a switch connected between the AC power supply and the load, and
a first controller that operates upon receiving an operating power supply voltage based on the first DC power supply voltage to thereby control ON/OFF of the switch, and
each of the plurality of power conversion modules includes
a power converter that converts power supplied from the AC power supply or a power storage device into AC power and supplies the AC power to the load, and
a second controller that operates upon receiving an operating power supply voltage based on the first DC power supply voltage to thereby control the power converter,
the bypass module further includes a first control power supply, the first control power supply being connected to the power supply line and generating the operating power supply voltage for the first controller using the first DC power supply voltage, and
each of the plurality of power conversion modules further includes a second control power supply, the second control power supply being connected to the power supply line and generating the operating power supply voltage for the second controller using the first DC power supply voltage, wherein
the second control power supply includes a second DC/DC converter that converts the first DC power supply voltage into a third DC power supply voltage, and
the second controller includes
a second control circuit that operates upon receiving the third DC power supply voltage from the second DC/DC converter to thereby generate a control signal for controlling the power converter, and
a second driver that operates upon receiving the first DC power supply voltage from the power supply line to thereby drive the power converter in accordance with the control signal output from the second control circuit.

3. The uninterruptible power supply apparatus according to claim 2, wherein
in each of the plurality of power conversion modules, the power converter includes
a converter that converts AC power supplied from the AC power supply into DC power,
an inverter that converts the DC power generated by the converter or DC power in the power storage device into AC power, and
a DC line connected between the converter and the inverter, and
the second control power supply further includes a third DC/DC converter that converts a DC voltage on the DC line into the first DC power supply voltage and outputs the first DC power supply voltage to the power supply line.

4. An uninterruptible power supply apparatus comprising:
a plurality of power conversion modules connected in parallel between an AC power supply and a load;
a bypass module connected between the AC power supply and the load;
an AC/DC converter that converts an AC voltage supplied from the AC power supply or an AC voltage supplied to the load into a first DC power supply voltage; and
a power supply line that transmits the first DC power supply voltage generated by the AC/DC converter to the plurality of power conversion modules and the bypass module, wherein
the bypass module includes
a switch connected between the AC power supply and the load, and
a first controller that operates upon receiving an operating power supply voltage based on the first DC power supply voltage to thereby control ON/OFF of the switch, and
each of the plurality of power conversion modules includes
a power converter that converts power supplied from the AC power supply or a power storage device into AC power and supplies the AC power to the load, and
a second controller that operates upon receiving an operating power supply voltage based on the first DC power supply voltage to thereby control the power converter,
the bypass module further includes a first control power supply, the first control power supply being connected to the power supply line and generating the operating power supply voltage for the first controller using the first DC power supply voltage, and
each of the plurality of power conversion modules further includes a second control power supply, the second control power supply being connected to the power supply line and generating the operating power supply voltage for the second controller using the first DC power supply voltage, wherein
the AC/DC converter is mounted on the bypass module.

* * * * *